(12) United States Patent
Wallace et al.

(10) Patent No.: US 7,093,996 B2
(45) Date of Patent: Aug. 22, 2006

(54) METHODS AND APPARATUS FOR MOUNTING A GAS TURBINE ENGINE

(75) Inventors: Thomas Tracy Wallace, Maineville, OH (US); Nelson Dirk Gibbens, Mason, OH (US); Martin Joseph Pierce, Milford, OH (US); Cornelius H. Dykhuizen, Westchester, OH (US)

(73) Assignee: General Electric Company, Schenectady, NY (US)

( * ) Notice: Subject to any disclaimer, the term of this patent is extended or adjusted under 35 U.S.C. 154(b) by 392 days.

(21) Appl. No.: 10/426,410

(22) Filed: Apr. 30, 2003

(65) Prior Publication Data

US 2004/0216461 A1 Nov. 4, 2004

(51) Int. Cl.
*F16D 1/12* (2006.01)

(52) U.S. Cl. ........................................... 403/78; 403/79
(58) Field of Classification Search .............. 403/78–79
See application file for complete search history.

(56) References Cited

U.S. PATENT DOCUMENTS

| | | | |
|---|---|---|---|
| 4,074,519 A | * | 2/1978 | Garrett ........................... 59/95 |
| 4,147,029 A | | 4/1979 | Sargisson |
| 5,074,698 A | * | 12/1991 | Lippert ........................... 403/79 |
| 5,222,360 A | | 6/1993 | Antuna et al. |
| 5,307,623 A | | 5/1994 | Antuna et al. |
| 5,320,307 A | | 6/1994 | Spofford et al. |
| 5,443,229 A | | 8/1995 | O'Brien et al. |
| 5,452,575 A | | 9/1995 | Freid |
| 5,921,500 A | | 7/1999 | Ellis et al. |
| 5,927,644 A | | 7/1999 | Ellis et al. |
| 6,212,974 B1 | | 4/2001 | Van Duyn |
| 6,296,203 B1 | | 10/2001 | Manteiga et al. |
| 6,309,131 B1 | | 10/2001 | Dawson |
| 6,330,985 B1 | | 12/2001 | Manteiga et al. |
| 6,401,448 B1 | | 6/2002 | Manteiga et al. |
| 6,659,878 B1 | * | 12/2003 | Anderson ..................... 470/18 |

* cited by examiner

*Primary Examiner*—John R. Cottingham
(74) *Attorney, Agent, or Firm*—Armstrong Teasdale LLP; William Scott Andes

(57) ABSTRACT

A method enables a thrust link including a clevis to be coupled to a mounting lug including a spherical bearing. The method comprises positioning the spherical bearing within the thrust link clevis, and coupling the thrust link to the mounting lug by inserting a fastener through the clevis such that the fastener extends from one side of the clevis through the spherical bearing to the other side of the clevis, and such that fuse element included with at least one of the fastener and the clevis is positioned within a structural load path defined between the clevis and the thrust link, wherein the fuse element is configured to fail when subjected to a predetermined load.

15 Claims, 8 Drawing Sheets

METHODS AND APPARATUS FOR MOUNTING A GAS TURBINE ENGINE

BACKGROUND OF THE INVENTION

This application relates generally to coupling assemblies and, more particularly, to methods and apparatus for coupling a thrust link to a mounting lug.

At least some known coupling assemblies include a thrust link that is coupled to a mounting lug or yoke to support a secondary structure. For example, such coupling assemblies may be used to support secondary structures, such as geardrive trains, or turbomachinery. The thrust link provides the loadpath through which engine thrust is transmitted to the aircraft pylon/wing structure. More specifically, the thrust link includes a clevis end that is sized to receive a spherical bearing extending from the mounting lug.

Gas turbine engines typically include a rotor assembly, a compressor, and a turbine. The rotor assembly includes a fan that includes an array of fan blades extending radially outward from a rotor shaft. The rotor shaft transfers power and rotary motion from the turbine to the compressor and the fan and is supported longitudinally with at least one connector assembly. The thrust link also provides additional carcass "backbone" stiffening to resist bending of secondary structures due to thrust or maneuver loads. This stiffening facilitates preventing rubbing between the turbomachinery blade tips and secondary structure.

During operation of the engine, a fragment of a fan blade may become separated from the remainder of the blade. Consequently, a substantial rotary unbalance load may be created within the damaged fan and carried substantially by the fan shaft bearings, the fan bearing supports, and the connector assemblies. Accordingly, to minimize the effects of potentially damaging abnormal imbalance loads, known connector assemblies for the fan rotor support system are sized to provide additional strength for the fan support system. However, increasing the strength of such connector assemblies may undesirably increase an overall weight of the engine and/or decrease an overall efficiency of the engine when the engine is operated without substantial rotor imbalances.

BRIEF DESCRIPTION OF THE INVENTION

In one aspect, a method for coupling a thrust link including a clevis to a mounting lug including a spherical bearing is provided. The method comprises positioning the spherical bearing between the thrust link clevis, and coupling the thrust link to the mounting lug by inserting a fastener through the clevis such that the fastener extends from one side of the clevis through the spherical bearing to the other side of the clevis, and such that a fuse element included with at least one of the fastener and the clevis is positioned within a structural load path defined between the clevis and the thrust link.

In another aspect of the invention, a connector assembly is provided. The connector assembly includes a thrust link and a clevis. The thrust link includes a first end, a second end, and a body extending therebetween. The clevis is telescopically coupled to at least one of the thrust link first end and the second end such that a fuse element extends between the clevis and the thrust link. The fuse element is positioned within a structural load path between the clevis and the thrust link, and is configured to fail when subjected to a predetermined load.

In a further aspect, a connector assembly is provided. The connector assembly includes a thrust link, a clevis, a fastener, and a mount lug. The thrust link includes a first end, a second end, and a body extending therebetween. The clevis is coupled to at least one of the thrust link first end and the second end. The mount lug includes a spherical bearing, and the mount lug is coupled to the clevis by the fastener. The clevis is sized to receive the spherical bearing therein. At least one of the fastener and the clevis includes a fuse element positioned within a structural load path defined between the clevis and the thrust link. The fuse element is configured to fail when subjected to a predetermined load.

DETAILED DESCRIPTION OF THE INVENTION

Figure 1:
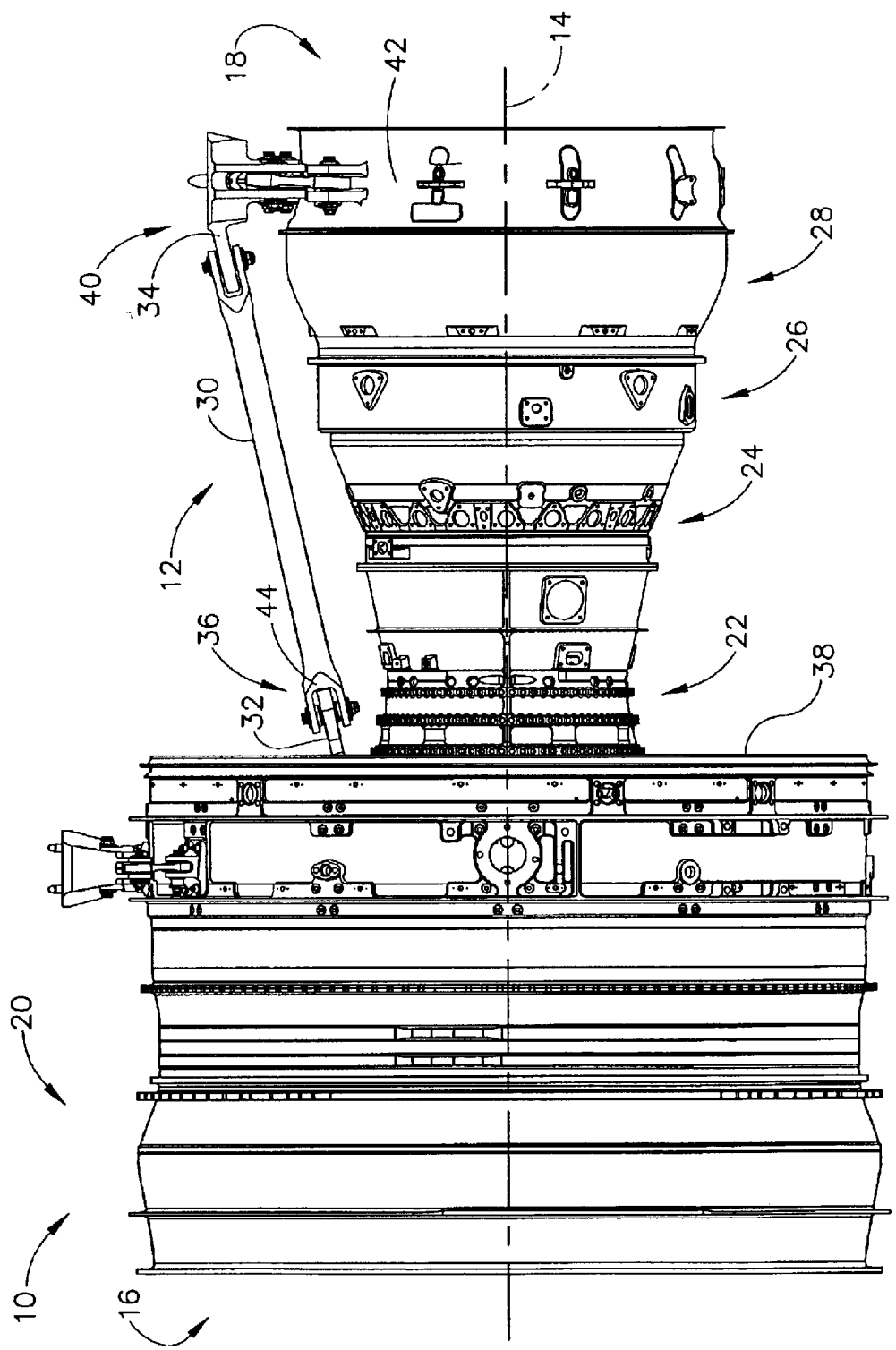
FIG. 1 is a perspective view of an exemplary gas turbine engine including a known connector assembly.

FIG. 1 is a perspective view of an exemplary gas turbine engine 10 including a known connector assembly 12. Engine 10 has a longitudinal or axial centerline axis 14 extending from an inlet end 16 to an exhaust end 18. Engine 10 includes a fan assembly 20, a high pressure compressor 22, and a combustor 24. Engine 10 also includes a high pressure turbine 26, and a low pressure turbine 28.

Connector assembly 12 includes a thrust link 30 and a pair of mounting lugs or yokes 32 and 34. An upstream end 36 of thrust link 30 is coupled to a forward fan frame 38 by mounting lug 32, and a downstream end 40 of thrust link 30 is coupled to an aft turbine frame 42 by mounting lug 34. Each mounting lug 32 and 34 includes a spherical bearing (not shown) that is received within a clevis 44 formed at each thrust link end 36 and 40. More specifically, the spherical bearings enable engine thrust loading to be transmitted from forward fan frame 38 through thrust link 30 to aft turbine frame 42.

During a fan blade out (FBO) a system natural frequency mode may be induced in fan assembly 20 which may force the aft bulkhead of fan frame 38 to pitch fore and aft sinusoidally. Thrust link 30 connects fan frame 38 to aft turbine frame 42 to facilitate providing a restraining tendency to this pitch deflection. However, known thrust link 30 may overload and fail because the mass inertia of fan assembly 20. Known attempts to stiffen thrust link 30 have simply added to the loading because it is essentially deflection controlled, as given by the formula F=KX. However, in order to maintain a safe shutdown and subsequent windmill of the engine during the time it takes to land an aircraft, thrust link 30 must maintain radial stiffness to provide fan critical speed margin above a fly-home windmilling speed. Accordingly, allowing thrust link 30 to fail adversely affects fly-home capability.

Figure 2:
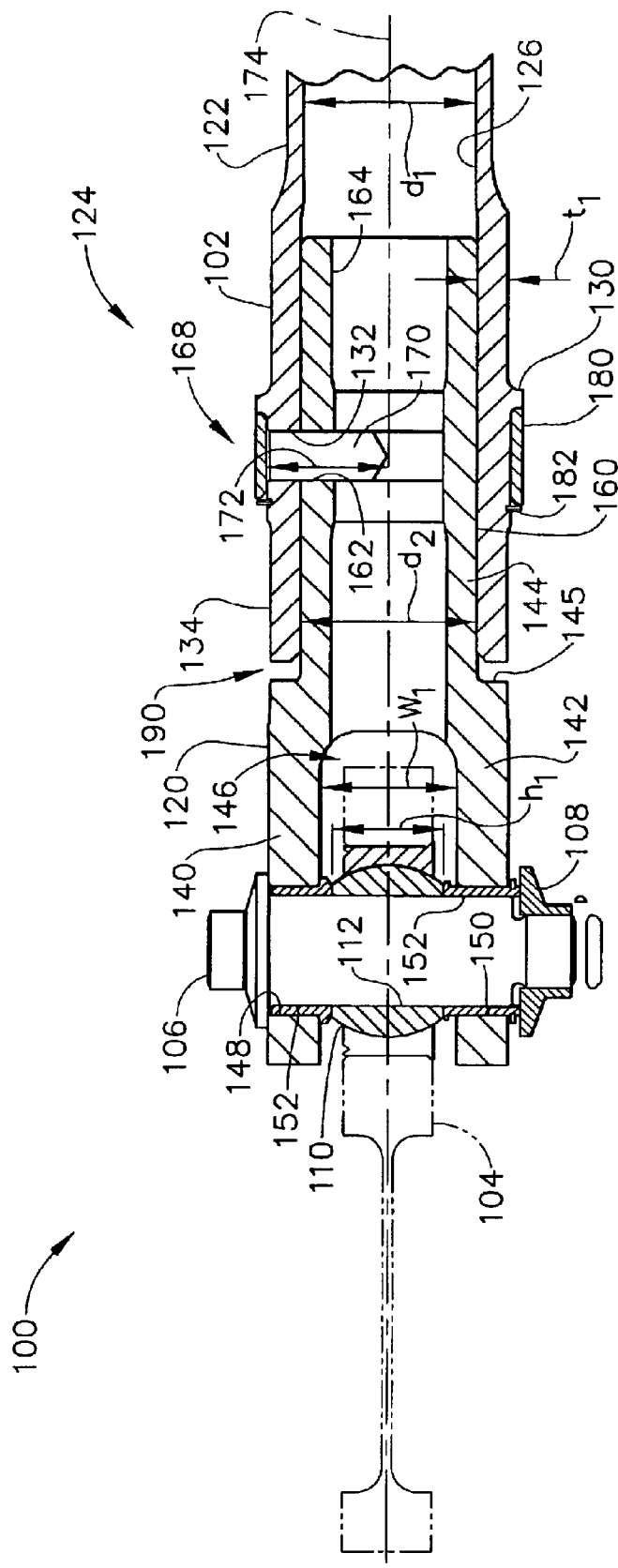
FIG. 2 is a connector assembly that may be used with the gas turbine engine shown in FIG. 1.

FIG. 2 is a connector assembly 100 that may be used with gas turbine engine 10. Connector assembly 100 includes a thrust link 102 that is coupled to a mounting lug or yoke 104 by a fastener 106. In the exemplary embodiment, fastener 106 is a threaded bolt and is retained in position by a nut 108. A spherical bearing 110 formed integrally with yoke 104 has a height $h_1$, and includes an opening 112 extending therethrough. Opening 112 is sized to receive fastener 106 therethrough.

Thrust link 102 includes a clevis 120 and a hollow link tube portion 122. Clevis 120 is telescopically coupled to tube portion 122. Tube portion 122 is substantially cylindrical and extends between a pair of ends 124. In the exemplary embodiment, tube portion 122 has a substantially circular cross-sectional profile. Ends 124 are defined by increased wall thicknesses $t_1$ that provide increased structural support to ends 124. Despite increased wall thicknesses $t_1$, an inner diameter $d_1$ of tube portion 122, measured with respect to an inner surface 126 of tube portion 122, is substantially constant between tube portion ends 124.

Each tube end 124 also includes an annular shoulder 130 and at least one opening 132. Shoulder 130 extends radially outwardly from an outer surface 134 of tube portion 122. Opening 132 extends radially inward from tube portion outer surface 134 to inner surface 126. In the exemplary embodiment, tube end 124 includes three openings 132 evenly-spaced circumferentially around tube end 124. More specifically, openings 132 are axially-aligned with respect to tube portion 122.

Clevis 120 is substantially U-shaped and includes a first arm 140 and a second arm 142 that extend from a hollow body 144, such that a shoulder 145 is defined between body 144 and arms 140 and 142. Arms 140 and 142 define a cavity 146 therebetween that is sized to receive spherical bearing 110 therein. More specifically, cavity 146 has a width $W_1$, measured between arms 140 and 142 that is wider than spherical bearing height $h_1$.

Each clevis arm 140 and 142 includes a respective opening 148 and 150 extending therethrough. Openings 148 and 150 are identical and are concentrically aligned, and are sized to receive fastener 106 therethrough for coupling thrust link 102 to mounting yoke 104. A bushing 152 circumferentially extends around each opening 148 and 150. In the exemplary embodiment, bushings 152 are integral to clevis 120.

Clevis 120 is telescopically coupled to tube portion 122 by clevis body 144. Clevis body 144 has a cross-sectional profile that is substantially similar to the cross-sectional profile defined by tube portion inner surface 126. In the exemplary embodiment, clevis body 144 has a substantially circular cross-sectional profile. Specifically, clevis body 144 has a diameter $d_2$ measured with respect to an external surface 160 of body 144. Body diameter $d_2$ is substantially constant through body 144 and is slightly smaller than tube portion inner diameter $d_1$, such that tube portion 122 is sized to receive clevis body 144 therein. More specifically, clevis body 144 is slidably coupled within tube portion 122.

Clevis body 144 includes at least one opening 162 extending radially therethrough from clevis body external surface 160 to an internal surface 164 of body 144. In the exemplary embodiment, body 144 includes three openings 162 that are positioned in correspondence to thrust link openings 132.

During assembly of connector assembly 100, initially thrust link 102 is assembled. More specifically, clevis 120 is telescopically coupled to tube portion 122 and retained in relative position by a fuse element 168. Specifically, fuse element 168 includes a plurality of shear pins 170 that are inserted through tube portion openings 132 and through corresponding, concentrically-aligned clevis body openings 162. Specifically, each shear pin 170 has a length 172 that enables each pin 170 to extend through openings 132 and 162 while not extending past a centerline axis 174 of clevis body 144.

Pins 170 are retained in coupling position by an annular sleeve 180 that extends circumferentially around tube portion 122 and across pins 170. Specifically, sleeve 180 is axially-aligned with pins 170 such that pins 170 are radially inward from sleeve 180. Sleeve 180 is retained in axial-alignment by a wound retention ring 182 such that sleeve 180 is positioned against tube portion shoulder 130.

When clevis 120 is coupled to tube portion 122 by pins 170, clevis 120 is aligned substantially concentrically with respect to tube portion 122, and such that a predetermined axial gap 190 is defined between tube portion 122 and clevis arms 140 and 142. More specifically, gap 190 is defined between tube portion 122 and clevis shoulder 145.

Thrust link 102 is then coupled to mounting lug 104 by fastener 106. Specifically, spherical bearing 110 is inserted within clevis cavity 146 such that bearing opening 112 is substantially aligned with respect to clevis arm openings 148 and 150, and fastener 106 is then extended through clevis 120 and lug 104. Nut 108 is then threadably coupled to fastener 106 such that thrust link 102 is coupled to mounting lug 104.

During normal operations, loading is transmitted through thrust link 102 to mounting lug 104, or vice-versa. Specifically, loading is transmitted through clevis 120, fuse element 168, and tube portion 122. However, during abnormal or extreme loading, such as may occur in a turbine engine following a fan blade out (FBO) condition, fuse element 168 will fail when subjected to a predetermined load. More specifically, when fuse element 168 is subjected to a predetermined load, pins 170 shear, permitting post-fused axial motion between clevis 120 and tube portion 122 through gap 190. Shoulder 145 limits an amount of axial movement towards mounting lug 104. Moreover, the post-fused loading is carried by clevis 120 and tube portion 122 in a compressive direction only which enables connector assembly 100 to carry windmilling and drag load once the FBO event subsides. Accordingly, fuse element 168 provides protection against deflection controlled loading, while still maintaining load controlled force capability.

Figure 3:
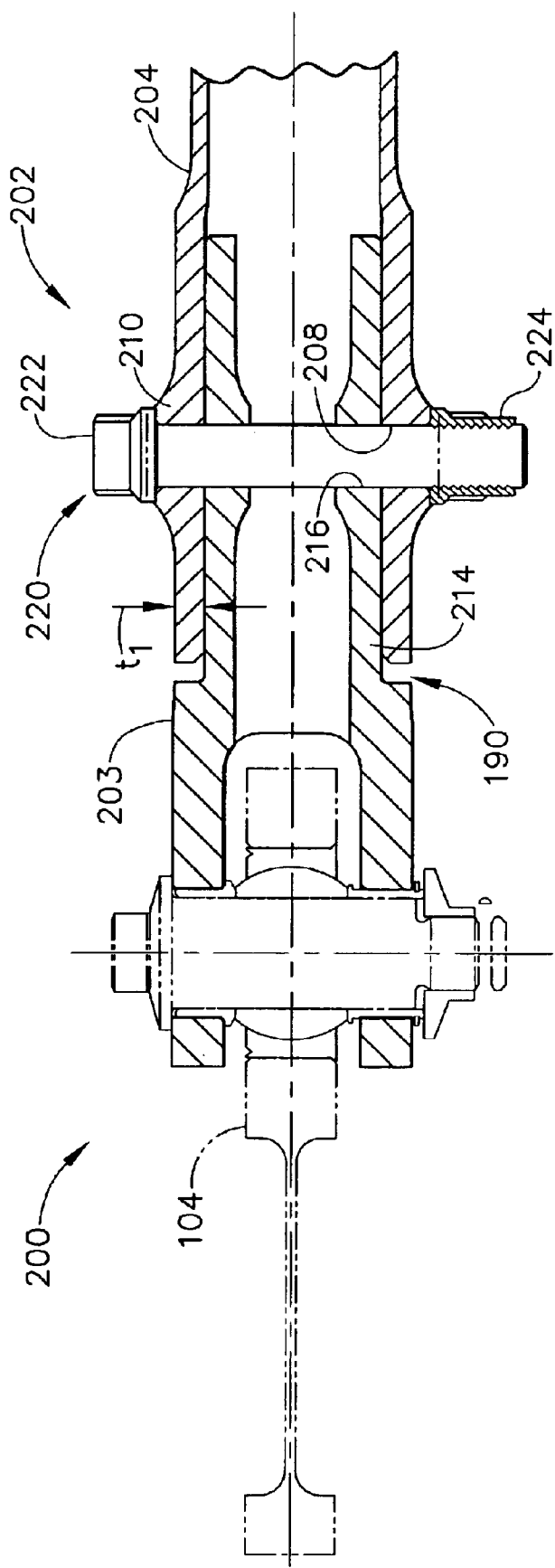
FIG. 3 is an alternative embodiment of a connector assembly that may be used with the gas turbine engine shown in FIG. 1.

FIG. 3 is an alternative embodiment of a connector assembly 200 that may be used with gas turbine engine 10 (shown in FIG. 1). Connector assembly 200 is substantially similar to connector assembly 100 shown in FIG. 2, and components in connector assembly 200 that are identical to components of connector assembly 100 are identified in FIG. 3 using the same reference numerals used in FIG. 2. Accordingly, connector assembly 200 includes a thrust link 202, and mounting lug or yoke 104. Thrust link 202 includes a clevis 203 and a telescopically coupled hollow link tube portion 204.

Tube portion 204 is substantially similar to link tube portion 122 (shown in FIG. 2), but rather than including a plurality of openings 132 (shown in FIG. 2), tube portion 204 includes one opening 208 that extends diametrically through tube portion 204. Additionally, tube portion 204 does not include shoulder 130 (shown in FIG. 2). More specifically, opening 208 extends through a boss 210 extending from outer surface 134 adjacent to the increased wall thickness $t_1$.

Clevis 203 is substantially similar to clevis 120, (shown in FIG. 2), but rather than including a plurality of openings 162 (shown in FIG. 2), clevis body 214 includes only one opening 216 that extends diametrically through body 214. In one embodiment, openings 216 and 208 are formed by line-drilling.

During assembly of connector assembly 200, clevis 120 is telescopically coupled to tube portion 204 and retained in relative position by a fuse element 220. Specifically, fuse element 220 includes a fuse pin 222 and a nut 224. Pin 222 is press fit through openings 208 and 216 and is retained in position by nut 224.

During normal operations, loading is transmitted through thrust link 202 to mounting lug 104, or vice-versa. However, during abnormal or extreme loading, such as may occur in a turbine engine following a fan blade out (FBO) condition, fuse element 220 will fail when subjected to a predetermined load. More specifically, when fuse element 220 is subjected to a predetermined load, fuse pin 222 shears, permitting post-fused axial motion between clevis 203 and tube portion 204 through gap 190. Moreover, the post-fused loading is carried by clevis 203 and tube portion 204 in a compressive direction only which enables connector assembly 200 to carry windmilling and drag loads once the FBO event subsides. Accordingly, fuse element 220 provides protection against deflection controlled loading, while still maintaining load controlled force capability.

Figure 4:
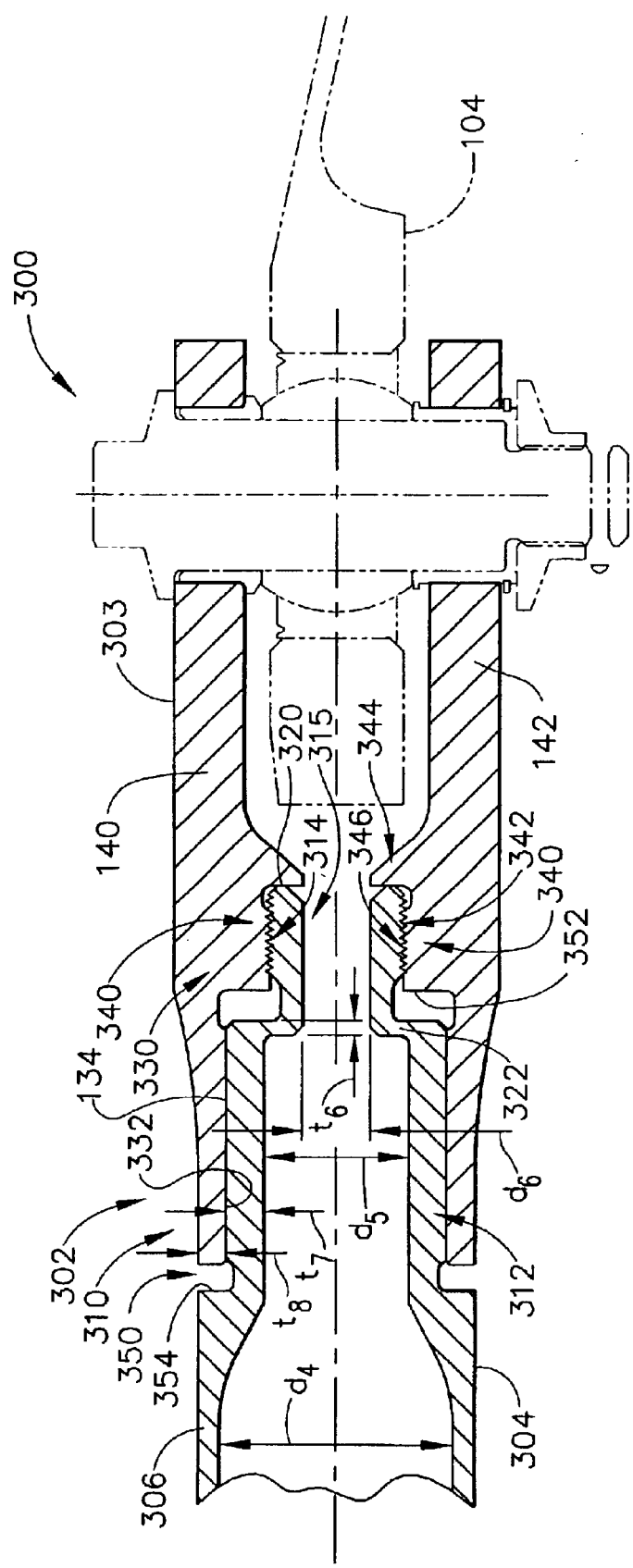
FIG. 4 is another alternative embodiment of a connector assembly that may be used with the gas turbine engine shown in FIG. 1.

FIG. 4 is another alternative embodiment of a connector assembly 300 that may be used with gas turbine engine 10 (shown in FIG. 1). Connector assembly 300 is substantially similar to connector assembly 100 shown in FIG. 2, and components in connector assembly 300 that are identical to components of connector assembly 100 are identified in FIG. 4 using the same reference numerals used in FIG. 2. Accordingly, connector assembly 300 includes a thrust link 302, and mounting lug or yoke 104. Thrust link 302 includes a clevis 303 and a telescopically coupled hollow link tube portion 304.

Tube portion 304 includes a body 306 that is substantially cylindrical and extends between a pair of ends 310. In the exemplary embodiment, body 306 has a substantially circular cross-sectional profile. More specifically, an inner diameter $d_4$ of tube portion body 304 tapers inward to an intermediate section 312. Intermediate section 312 extends between tube portion body 306 and threaded end 315 and has an inner diameter $d_5$ that is smaller than that of body 306.

End section 310 includes a plurality of internally disposed threads 314 that extend between intermediate section 312 and an end 320 of tube portion 304. Threaded end 315 has an inner diameter $d_6$ that is smaller than intermediate section inner diameter $d_5$. A fuse element 322 extends radially between intermediate section 312 and end 315. Fuse element 322 is formed integrally with end 315 and intermediate section 312, but is defined by the thinnest wall thickness $t_6$ within tube portion 304. More specifically, fuse element wall thickness $t_6$ is thinner than a respective intermediate section and end portion wall thickness $t_7$ and $t_8$.

Clevis 303 is substantially similar to clevis 120 (shown in FIG. 2) and includes arms 140 and 142 that extend from a hollow body 330. Clevis 303 is telescopically coupled to tube portion 304 by clevis body 330. Clevis body 330 has a cross-sectional profile defined by an inner surface 332 that is substantially similar to a cross-sectional profile defined by tube portion external surface 134. In the exemplary embodiment, clevis body 330 has a substantially circular cross-sectional profile.

Clevis body 330 also includes an inwardly extending projection 340 that includes a threaded joint 342 and a stop 344. Threaded joint 342 includes a plurality of threads 346 that mate with tube portion threads 314 to couple tube portion 304 to clevis 303. Stop 344 limits an amount of internal threading that may occur between clevis 303 and tube portion 304, such that when clevis 303 is fully coupled to tube portion 304, a predetermined axial gap 350 is defined between tube portion 304 and clevis 303. More specifically, gap 350 is defined between clevis body 330 and a shoulder 354 defined between tube portion body 306 and intermediate section 312.

During normal operations, loading is transmitted through thrust link 302 to mounting lug 104, or vice-versa. However, during abnormal or extreme loading, such as may occur in a turbine engine following a fan blade out (FBO) condition, fuse element 322 will shear when subjected to a predetermined load, permitting post-fused axial motion between clevis 303 and tube portion 304 through gap 350. Moreover, the post-fused loading is carried by clevis 303 and tube portion 304 in a compressive direction only which enables connector assembly 300 to carry windmilling and drag load once the FBO event subsides. Accordingly, fuse element 322 provides protection against deflection controlled loading, while still maintaining load controlled force capability.

Figure 5:
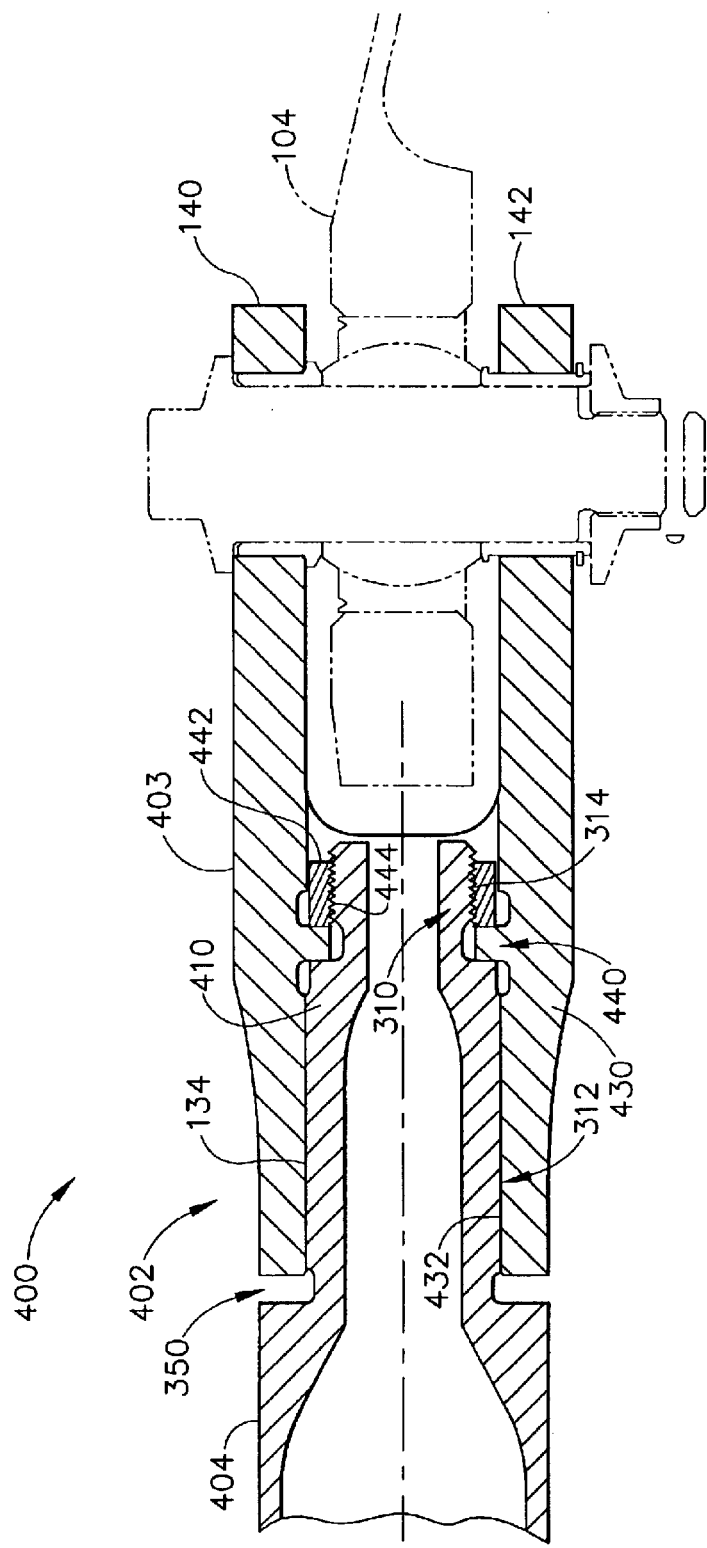
FIG. 5 is a further alternative embodiment of a connector assembly that may be used with the gas turbine engine shown in FIG. 1.

FIG. 5 is a further alternative embodiment of a connector assembly 400 that may be used with the gas turbine engine 10 (shown in FIG. 1). Connector assembly 400 is substantially similar to connector assembly 300 shown in FIG. 4, and components in connector assembly 400 that are identical to components of connector assembly 300 are identified in FIG. 5 using the same reference numerals used in FIG. 4. Accordingly, connector assembly 400 includes a thrust link 402, and mounting lug or yoke 104. Thrust link 402 includes a clevis 403 and a telescopically coupled hollow link tube portion 404.

Tube portion 404 is substantially similar to tube portion 304 (shown in FIG. 4), and includes intermediate section 312 and end section 310, but does not include fuse element 322. Rather, an annular shoulder 410 extends between intermediate section 312 and end section 310.

Clevis 403 is substantially similar to clevis 303 (shown in FIG. 4) and includes arms 140 and 142 that extend from a hollow body 430. Clevis 403 is telescopically coupled to tube portion 404 by clevis body 430. Clevis body 430 has a cross-sectional profile defined by an inner surface 432 that is substantially similar to a cross-sectional profile defined by tube portion external surface 134. In the exemplary embodiment, clevis body 430 has a substantially circular cross-sectional profile. Clevis body 430 also includes an inwardly extending shear ring or fuse element 440 that extends circumferentially within body 430 from inner surface 432.

A coupling nut 442 also extends radially inward from clevis body inner surface 432 and includes a plurality of threads 444 that mate with tube portion threads 314 to couple tube portion 404 to clevis 403. When clevis 403 is fully coupled to tube portion 404, predetermined axial gap 350 is defined between tube portion 404 and clevis 403, and fuse element 440 is securely clamped between coupling nut 442 and shoulder 410.

During normal operations, loading is transmitted through thrust link 402 to mounting lug 104, or vice-versa. However, during abnormal or extreme loading, such as may occur in a turbine engine following a fan blade out (FBO) condition, fuse element 440 will shear when subjected to a predetermined load, permitting post-fused axial motion between clevis 403 and tube portion 404 through gap 350. Moreover, the post-fused loading is carried by clevis 403 and tube portion 404 in a compressive direction only which enables connector assembly 400 to carry windmilling and drag loads once the FBO event subsides. Accordingly, fuse element 440 provides protection against deflection controlled loading, while still maintaining load controlled force capability.

Figure 6:
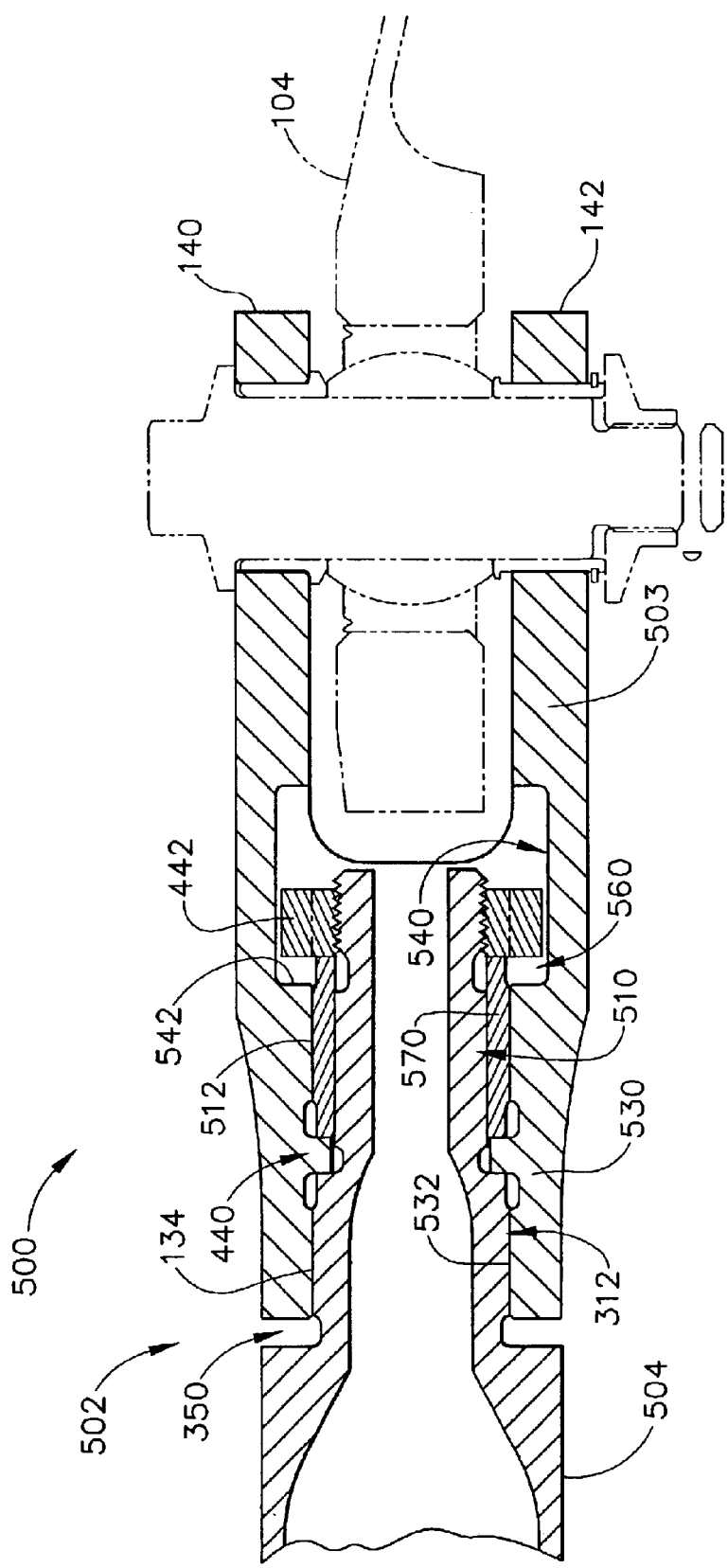
FIG. 6 is yet a further alternative embodiment of a connector assembly that may be used with the gas turbine engine shown in FIG. 1.

FIG. 6 is yet a further alternative embodiment of a connector assembly 500 that may be used with gas turbine engine 10 (shown in FIG. 1). Connector assembly 500 is substantially similar to connector assembly 400 shown in FIG. 5, and components in connector assembly 500 that are identical to components of connector assembly 400 are identified in FIG. 6 using the same reference numerals used in FIG. 5. Accordingly, connector assembly 500 includes a thrust link 502, and mounting lug or yoke 104. Thrust link 502 includes a clevis 503 and a tube portion 504. Tube portion 504 is substantially similar to tube portion 404 (shown in FIG. 5), and includes intermediate section 312 and an end section 510 that is elongated in comparison to end section 310. In addition, end section 510 includes an annular raised area 512.

Clevis 503 is substantially similar to clevis 403 (shown in FIG. 5) and includes arms 140 and 142 that extend from a hollow body 530. Clevis 503 is telescopically coupled to tube portion 504 by clevis body 530. Clevis body 530 has a cross-sectional profile defined by an inner surface 532 that is substantially similar to a cross-sectional profile defined by tube portion external surface 134. In the exemplary embodiment, clevis body 530 has a substantially circular cross-sectional profile. Clevis body 530 also includes inwardly extending shear ring or fuse element 440 that extends circumferentially within body 530 from inner surface 532.

Coupling nut 442 is used to couple tube portion 504 to clevis 503. Coupling nut 442 is positioned within a recessed area 540 defined between a pair of shoulders 542 formed within clevis body 530. When clevis 503 is fully coupled to tube portion 504, not only is predetermined axial gap 350 defined between tube portion 504 and clevis 503, but in addition, a second predetermined axial gap 560 is defined between coupling nut 442 and shoulders 542.

Connector assembly 500 includes an annular sleeve 570 that extends circumferentially around tube portion 504, and is positioned axially between coupling nut 442 and fuse element 440. More specifically, sleeve 570 extends circumferentially around end section raised area 512.

During normal operations, loading is transmitted through thrust link 502 to mounting lug 104, or vice-versa. However, during abnormal or extreme loading, such as may occur in a turbine engine following a fan blade out (FBO) condition, fuse element 440 will shear when subjected to a predetermined load, permitting post-fused axial motion between clevis 503 and tube portion 504 through gaps 350 and 560. Moreover, the post-fused loading is carried by clevis 503 and tube portion 504 in compressive and tensile directions. Accordingly, fuse element 440 provides protection against deflection controlled loading, while still maintaining load controlled force capability.

Figure 7:
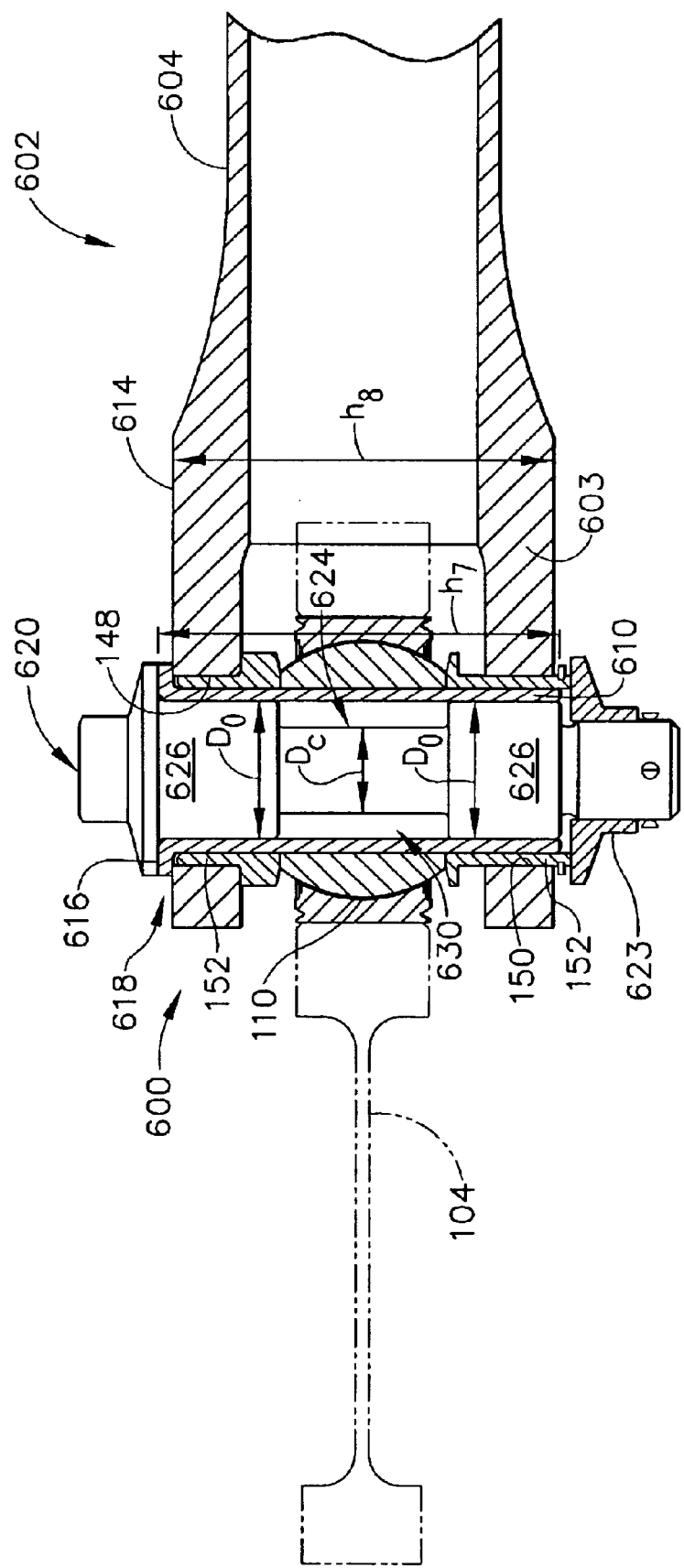
FIG. 7 is another alternative embodiment of a connector assembly that may be used with the gas turbine engine shown in FIG. 1.

FIG. 7 is another alternative embodiment of a connector assembly 600 that may be used with the gas turbine engine 10 (shown in FIG. 1). Connector assembly 600 is substantially similar to connector assembly 100 shown in FIG. 2, and components in connector assembly 600 that are identical to components of connector assembly 100 are identified in FIG. 7 using the same reference numerals used in FIG. 2. Accordingly, connector assembly 600 includes a thrust link 602, and mounting lug or yoke 104. Thrust link 602 is substantially similar to thrust link 102 (shown in FIG. 2) and includes a clevis 603 and an integrally-formed tube portion 604. Tube portion 604 is substantially similar to tube portion 122 (shown in FIG. 2), but does not include openings 132 or shoulder 130. Rather, tube portion 604 tapers gradually outwardly to form clevis 603.

In addition, connector assembly 600 includes a shear sleeve or fuse element 610 that is substantially cylindrical and has a height $h_7$ that is taller than a height $h_8$ of clevis 603 measured with respect to an external surface 614 of clevis 603. More specifically, sleeve 610 includes an annular lip 616 that extends radially outwardly from an end 618 of sleeve 610. Lip 616 facilitates positioning sleeve 610 with respect to clevis 603. More specifically, lip 616 facilities positioning sleeve 610 through spherical bearing 110 and within both clevis openings 148 and 150, such that bushings 152 are positioned between clevis arm openings 148 and 150 and sleeve 610.

Thrust link 602 is coupled to mounting lug 104 by a fastener 620 that is inserted through clevis opening 148, spherical bearing 110, and through clevis opening 150. A nut 623 is threadably coupled to fastener 620 to secure thrust link 602 to mounting lug 104. More specifically, when thrust link 602 is coupled to mounting lug 104, sleeve 610 extends circumferentially around fastener 620, between fastener 620 and bushings 152.

Fastener 620 includes a recessed center portion 624 that extends only through spherical bearing 110 when thrust link 602 is coupled to mounting lug 104. Fastener 620 also includes a pair of integrally-formed outer portions 626 that extend through clevis openings 148 and 150 when thrust link 602 is coupled to mounting lug 104. Fastener center portion 624 has a diameter $D_c$ that is smaller than a diameter $D_o$ of outer portions 626. Accordingly, when thrust link 602 is coupled to mounting lug 104, a predetermined radial gap 630 is defined between fastener center portion 624 and sleeve 610.

During normal operations, loading is transmitted through thrust link 602 to mounting lug 104, or vice-versa. However, during abnormal or extreme loading, such as may occur in a turbine engine following a fan blade out (FBO) condition, fuse element 610 will fail when subjected to a predetermined load. More specifically, when fuse element 610 is subjected to a predetermined load, sleeve 610 will shear, permitting post-fused axial motion between thrust link 602 and mounting lug 104 through radial gap 630. Moreover, the post-fused loading is carried by thrust link 602 in compressive and tensile directions which enables connector assembly 600 to carry windmilling and drag loads once the FBO event subsides. Accordingly, fuse element 610 provides protection against deflection controlled loading, while still maintaining load controlled force capability.

Figure 8:
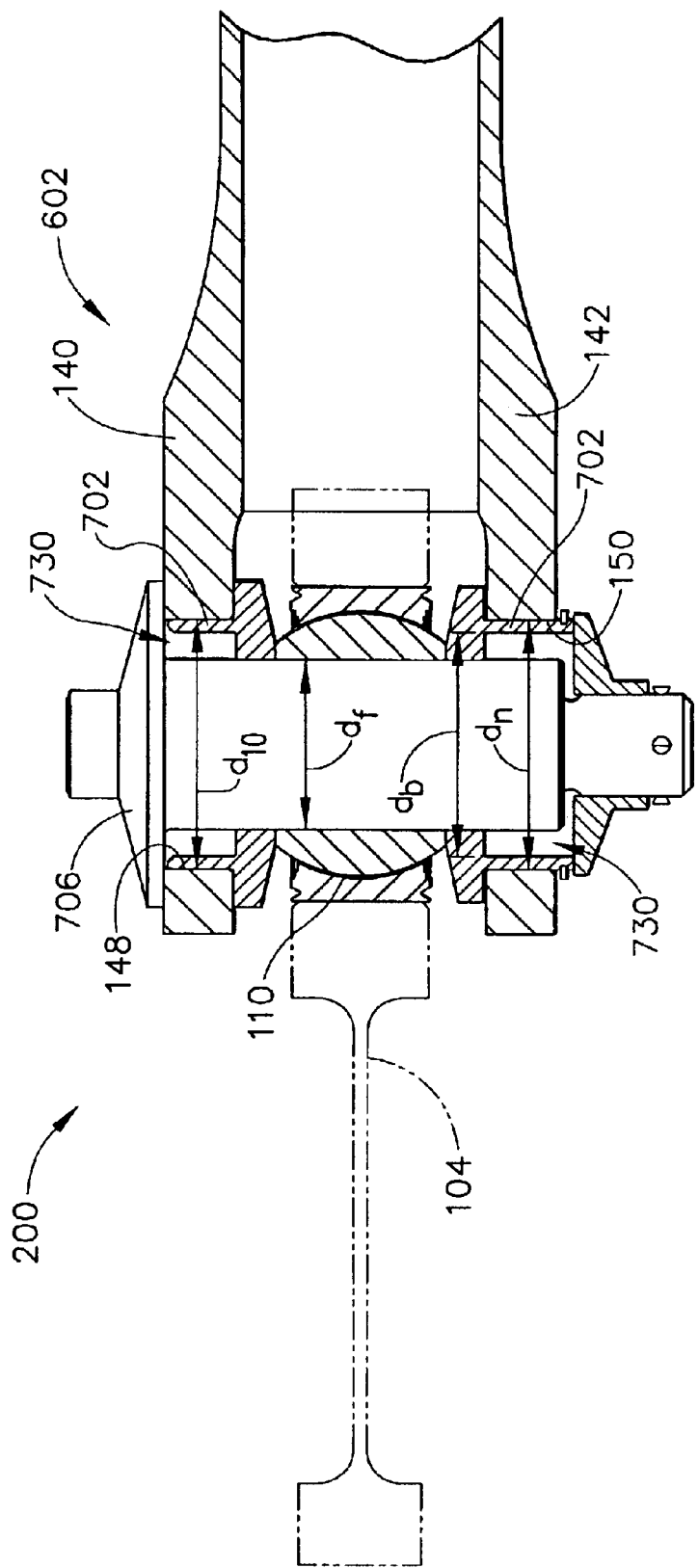
FIG. 8 is yet another alternative embodiment of a connector assembly that may be used with the gas turbine engine shown in FIG. 1.

FIG. 8 is yet another alternative embodiment of a connector assembly 700 that may be used with gas turbine engine (10) shown in FIG. 1. Connector assembly 700 is substantially similar to connector assembly 100 and 600 shown in respective FIGS. 2 and 7, and components in connector assembly 700 that are identical to components of connector assemblies 100 and 600 are identified in FIG. 8 using the same reference numerals used in respective FIGS. 2 and 7. Accordingly, connector assembly 700 includes thrust link 602, and mounting lug or yoke 104. However, connector assembly 700 does not include bushings 152, but rather includes a pair of fuse bushings 702 that extend through clevis arm openings 148 and 150.

When thrust link 602 is coupled to mounting lug 104 by a fastener 706, fuse bushings 702 extend circumferentially around, and against, fastener 706, and are also axially-positioned between fastener 706 and each respective clevis arm 140 and 142. More specifically, fastener 706 has a diameter $d_f$ that is smaller than a diameter $d_{10}$ and $d_{11}$ of each respective clevis opening 148 and 150. Fastener diameter $d_f$ is also smaller than an inner diameter $d_b$ of the portion of each fuse bushing 702 that extends through each clevis opening 148 and 150. Accordingly, when thrust link 602 is coupled to mounting lug 104, a predetermined radial gap 730 between the portion of each fuse bushing 702 extending through each clevis opening 148 and 150, and fastener 706.

During normal operations, loading is transmitted through thrust link 602 to mounting lug 104, or vice-versa. However, during abnormal or extreme loading, such as may occur in a turbine engine following a fan blade out (FBO) condition, fuse bushings 702 will fail when subjected to a predetermined load. More specifically, when fuse bushing 702 is subjected to a predetermined load, bushings 702 will shear, permitting post-fused axial motion between thrust link 602 and mounting lug 104 through radial gaps 730. Moreover, the post-fused loading is carried by thrust link 602 in compressive and tensile directions. Accordingly, fuse bushings 702 provide protection against deflection controlled loading, while still maintaining load controlled force capability.

The above-described coupling assemblies include a thrust link that is coupled to a mounting lug by a fastener. At least one of the thrust link and the fastener includes a fuse element that is positioned within the structural load path defined through the coupling assembly. The fuse element can carry loads and/or induced forces under normal operation, but when subjected to a predetermined load or ultimate loading, the fuse element shears to free itself from dynamic deflections induced by the mating component. However, despite shearing, the connector assembly still maintains its load carry capability in at least one direction. As a result, the fuse element facilitates protecting the connector assembly from dynamic force content and/or deflection controlled loading, while still maintaining load controlled force capability.

Exemplary embodiments of connector assemblies are described above in detail. The connector assemblies are not limited to the specific embodiments described herein, but rather, components of each assembly may be utilized independently and separately from other components described herein. For example, each connector assembly component can also be used in combination with other combustor and engine components, and in combination with the other connector assembly components described herein.

While the invention has been described in terms of various specific embodiments, those skilled in the art will recognize that the invention can be practiced with modification within the spirit and scope of the claims.

What is claimed is:

1. A connector assembly comprising:
a thrust link comprising a first end, a second end, and a body extending therebetween; and
a clevis telescopically coupled to at least one of said thrust link first end and said second end such that a portion of said clevis is positioned against a portion of said thrust link and such that a fuse element extends between said clevis and said thrust link, said fuse element positioned within a structural load path between said clevis and said thrust link, and configured to fail when subjected to a predetermined load.

2. A connector assembly in accordance with claim 1 wherein said clevis coupled to said thrust link such that a predetermined axial gap is defined between said thrust link and said clevis.

3. A connector assembly in accordance with claim 1 wherein said fuse element comprises at least one pin extending radially through at least a portion of said thrust link and said clevis.

4. A connector assembly in accordance with claim 1 wherein said fuse element comprises at least one pin extending through said thrust link and said clevis.

5. A connector assembly in accordance with claim 1 wherein said clevis is threadingly coupling to said thrust link.

6. A connector assembly in accordance with claim 1 wherein said thrust link further comprises a radially extending shoulder, said fuse element comprises an annular ring extending between said clevis and said thrust link, and adjacent said thrust link shoulder.

7. A connector assembly in accordance with claim 1 wherein said predetermined gap configured to permit axial movement of said clevis with respect to said thrust link following failure of said fuse element.

8. A connector assembly in accordance with claim 1 wherein said clevis coupled to said thrust link by a coupling nut.

9. A connector assembly comprising:
a thrust link comprising a first end, a second end, and a body extending therebetween;
a clevis coupled to at least one of said thrust link first end and said second end such that at least a portion of said clevis is positioned against one of said thrust link first end and said second end;
a fastener;
a mount lug comprising a spherical bearing, said mount lug coupled to said clevis by said fastener, said clevis sized to receive said spherical bearing therein, at least one of said fastener and said clevis comprising a fuse element positioned within a structural load path defined between said clevis and said thrust link, said fuse element configured to fail when subjected to a predetermined load.

10. A connector assembly in accordance with claim 9 wherein said clevis is telescopically coupled to said thrust link such that a predetermined axial gap is defined between said thrust link and said clevis, said fuse element comprises at least one pin extending radially through at least a portion of said thrust link and said clevis.

11. A connector assembly in accordance with claim 9 wherein said clevis is telescopically coupled to said thrust link such that a predetermined axial gap is defined between said thrust link and said clevis, said fuse element comprises at least one pin extending through said thrust link and said clevis.

12. A connector assembly in accordance with claim 9 wherein said clevis is telescopically coupled to said thrust link such that a predetermined axial gap is defined between said thrust link and said clevis, said thrust link further comprises a radially extending shoulder, said fuse element comprises an annular ring extending between said clevis and said thrust link, said annular ring adjacent said thrust link shoulder.

13. A connector assembly in accordance with claim 9 wherein said clevis is telescopically coupled to said thrust link such that a predetermined axial gap is defined between said thrust link and said clevis, said clevis coupled to said thrust link by a coupling nut.

14. A connector assembly in accordance with claim 9 wherein said fuse element comprises a sleeve extending circumferentially around said fastener along a length of said fastener such that said sleeve extends between said fastener and said clevis, said sleeve positioned such that a radial gap is defined between a portion of said fastener and said sleeve.

15. A connector assembly in accordance with claim 9 wherein said fuse element comprises a pair of bushings extending circumferentially around said fastener between said fastener and said clevis, each said bushing positioned such that a radial gap is defined between a portion of said fastener and each said respective bushing.

* * * * *